(12) United States Patent
Blase et al.

(10) Patent No.: US 9,163,667 B2
(45) Date of Patent: Oct. 20, 2015

(54) SLIDE BEARING, SLIDE BEARING SYSTEM AND ASSEMBLY OF A SLIDE BEARING SYSTEM

(75) Inventors: Gunter Blase, Bergisch Gladbach (DE);
Frank Blase, Bergisch Gladbach (DE);
Ralf Selzer, Bergisch Gladbach (DE);
Christoph Klingshirn, Niederkassel (DE); Gerhard Baus, Windhagen (DE);
Markus Feth, Bonn-Beuel (DE)

(73) Assignee: Igus GmbH, Cologne (DE)

( * ) Notice: Subject to any disclaimer, the term of this patent is extended or adjusted under 35 U.S.C. 154(b) by 1562 days.

(21) Appl. No.: 11/911,271

(22) PCT Filed: Apr. 11, 2006

(86) PCT No.: PCT/DE2006/000647
§ 371 (c)(1),
(2), (4) Date: Jun. 25, 2008

(87) PCT Pub. No.: WO2006/108402
PCT Pub. Date: Oct. 19, 2006

(65) Prior Publication Data
US 2009/0110338 A1    Apr. 30, 2009

(30) Foreign Application Priority Data
Apr. 11, 2005  (DE) .................... 20 2005 005 827 U (51) Int. Cl.
*F16C 33/04*    (2006.01)
*B23P 11/00*    (2006.01)
(Continued)

(52) U.S. Cl.
CPC ................. *F16C 33/08* (2013.01); *F16C 33/20* (2013.01); *Y10T 29/49826* (2015.01)

(58) Field of Classification Search
CPC .................................. F16C 33/08; F16C 33/20
USPC ............. 384/296, 276, 275; 29/428; 403/282, 403/154, 408.1, 295
See application file for complete search history.

(56) References Cited

U.S. PATENT DOCUMENTS 4,127,310 A * 11/1978 Werner .......................... 384/149
4,134,175 A *  1/1979 Contoyanis ....................... 16/2.1
(Continued)

FOREIGN PATENT DOCUMENTS

DE         211589      * 4/1908  .................... 384/296
DE          63 595     * 9/1968  .................... 384/296
(Continued)

OTHER PUBLICATIONS

Physics Parts I and II, David Halliday and Robert Resnick, Publisher: John Wiley & Sons, Inc.. Apr. 1967, pp. 109-125.*
(Continued)

*Primary Examiner* — Vinh Luong
(74) *Attorney, Agent, or Firm* — Grossman Tucker Perreault & Pfleger, PLLC (57) ABSTRACT

A plain bearing 1 comprising a hollow-cylindrical plain bearing body and a first flange arranged at a first end of the plain bearing body and extending radially outwardly, as well as a plain bearing system comprising the plain bearing and a bearing receiving means and a method of assembling the plain bearing system.
To provide a plain bearing which for a press fit in a bearing receiving means allows greater dimensional tolerances in respect of the bearing receiving means, a ring of axially extending and peripherally spaced collar portions is provided at the second end of the plain bearing body, which is in opposite relationship to the first end, which collar portions can be bent over outwardly to afford a second flange.

12 Claims, 5 Drawing Sheets

(51) Int. Cl.
*F16C 33/08* (2006.01)
*F16C 33/20* (2006.01)

(56) References Cited

U.S. PATENT DOCUMENTS

| | | | | |
|---|---|---|---|---|
| 4,208,075 | A * | 6/1980 | Templeton | 384/29 |
| 4,804,277 | A * | 2/1989 | Counoupas | 384/537 |
| 4,939,827 | A * | 7/1990 | Iizuka | 29/898.054 |
| 5,139,348 | A * | 8/1992 | Bryden et al. | 384/275 |
| 5,259,689 | A * | 11/1993 | Arand et al. | 403/337 |
| 5,388,915 | A | 2/1995 | Huber | |
| 5,511,885 | A * | 4/1996 | Coleman | 384/439 |
| 5,735,021 | A * | 4/1998 | Briggs | 16/369 |
| 5,743,015 | A * | 4/1998 | Kunze et al. | 29/898.07 |
| 6,231,239 | B1 * | 5/2001 | Damour et al. | 384/275 |
| 6,238,127 | B1 | 5/2001 | Jhumra | |
| 6,361,239 | B1 * | 3/2002 | Parikh et al. | 403/282 |
| 6,485,180 | B2 * | 11/2002 | Mena | 384/222 |
| 6,648,512 | B1 * | 11/2003 | Storch et al. | 384/275 |
| 7,979,967 | B2 * | 7/2011 | Schmidt | 29/11 |
| 2005/0058375 | A1 * | 3/2005 | Ma | 384/276 |
| 2005/0084191 | A1 | 4/2005 | Fees et al. | |
| 2007/0121278 | A1 * | 5/2007 | Kruger | 361/600 |
| 2007/0277346 | A1 * | 12/2007 | Schmidt | 16/226 |

FOREIGN PATENT DOCUMENTS

| | | | |
|---|---|---|---|
| DE | 2317634 | 10/1974 | |
| DE | 9110303 | 10/1991 | |
| DE | 4215715 | 11/1993 | |
| GB | 902696 | 8/1962 | |
| JP | 6-159356 * | 6/1994 | F16C 17/10 |
| JP | 09112559 | 5/1997 | |
| JP | 2001050272 | 2/2001 | |
| WO | WO 2005/119072 A3 * | 12/2005 | F16C 17/10 |

OTHER PUBLICATIONS

EPO Machine translation of JP 6-159356, Hata Yushi, Jun. 1994.*
EPO Machine Translation of DE 211589, Franz, Apr. 1908.*
German Search Report issued in related German Patent Application No. 202005005827.0 dated Aug. 15, 2005. (4 pages).
International Search Report dated Aug. 10, 2006 issued in related International Patent Application No. PCT/DE2006000647 (2 pages).
English language translation of International Preliminary Report on Patentability dated Feb. 28, 2008 issued in related International Patent Application No. PCT/DE2006000647 (6 pages).

* cited by examiner

FIG. 6c

SLIDE BEARING, SLIDE BEARING SYSTEM AND ASSEMBLY OF A SLIDE BEARING SYSTEM

CROSS-REFERENCE TO RELATED APPLICATIONS

This application is a United States 371 national stage completion of international application no. PCT/DE2006/000647 filed Apr. 11, 2006 (published as WO 2006/108402 A1 on Oct. 19, 2006) designating the U.S., and which claims priority to German patent application serial no. DE 20 2005 005 827.0, filed Apr. 11, 2005, the teachings of which are incorporated herein by reference.

FIELD

The invention concerns a plain bearing system for a shaft for carrying axial and/or radial forces of the shaft comprising a plain bearing (1) which has a hollow-cylindrical plain bearing body (2) and a radially outwardly extending first flange (3) arranged at a first end (4) of the plain bearing body (2), wherein provided at the second end (5) of the plain bearing body (2), which is in opposite relationship to the first end (4), is a ring (6) of peripherally spaced collar portions (7) which are bent over outwardly to afford a second flange (8), and comprising a bearing receiving means (11) which has a bearing receiving means body (13) with a receiving opening (14) adapted to the outside diameter ($d_a$) of the plain bearing body (2) for receiving the plain bearing (1). The invention further concerns a method of assembling the plain bearing system.

BACKGROUND

Plain bearing systems of the general kind set forth with a plain bearing and a bearing receiving means are used for example as mass-produced articles in vehicle construction wherein the plain bearing is arranged with a press fit in a receiving opening of a receiving means to carry radially and axially acting forces and moments. So that the plain bearing is securely fitted in the receiving means, the receiving opening must be machined very accurately with close tolerances in order to achieve a tight fit between the plain bearing and the receiving means. That is highly problematical particularly in mass production as here deviations in the dimensions of usual metal plates from which the receiving means is made easily occur.

U.S. Pat. No. 6,238,127 B1 discloses a pivotal bearing system for pivotably fixing pivotable components such as for example a seat arrangement which can be leaned back. A disadvantage is the complicated and expensive structure of the pivotal bearing system. Furthermore the fit of the plain bearing in the bearing receiving means is not sufficiently firm.

SUMMARY

Therefore the object of the invention is to provide a plain bearing system of the kind set forth in the opening part of this specification, which is of a less complicated and expensive structure and the plain bearing of which involves an improved firm fit in the bearing receiving means.

In accordance with the invention the specified object is attained in that the receiving opening opens into two side faces of the bearing receiving means body, which serve for contact of the two flanges, a side face which is at the front in the receiving direction for contact of the first flange and a side face which is at the rear in the receiving direction for contact of the second flange formed by the bent-over collar portions.

The collar portions thus extend in a receiving position in a tongue-like configuration in an axial direction from the second end of the plain bearing body, wherein the outside diameter of the ring and the outside diameter of the plain bearing body are approximately equal to the inside diameter of a receiving opening of a receiving means for receiving the plain bearing. In that receiving position the collar portions can be passed in a receiving direction through the receiving opening until the first flange comes to bear against a side face of the receiving means, which is at the front in the receiving direction. The collar portions can then be bent over into a fixing position to form the second flange, until the second flange comes to bear against a side face which is at the rear in the receiving direction. In that way the plain bearing can be held at both sides in the receiving means by the two collars so that there is no need for the press fit by virtue of the plain bearing body being pressed into the receiving means in accordance with the state of the art which requires close dimensional tolerances in respect of the diameters of the plain bearing or the plain bearing body and the receiving opening. In addition the plain bearing is of a less complex structure in comparison with the bearing of U.S. Pat. No. 6,238,127 B1. Proposed herewith is a plain bearing assembly which, as described in fuller detail hereinafter, can be prefabricated in the form of a mass-produced part.

In a preferred development the wall thickness of the collar portions can be less than that of the plain bearing body. That provides that the collar portions can be bent over more easily. In that respect, a step can be provided as the transition between the plain bearing body and the ring. Preferably the collar portions should have a transitional region towards the plain bearing body, in which the wall thickness of the plain bearing body is blended into that of the collar portions. The transitional region, in comparison with the step, can be less sensitive in relation to crack formation when the collar portions are bent over. In a configuration, the transitional region should have a linearly extending cross-sectional narrowing which can be easily produced. For that purpose the transitional region can have a slope at its radially outward side. By virtue of that measure, when the collar portions are bent over, a lever action can occur, by which the plain bearing is further pulled with its plain bearing body into the receiving opening so that the first flange is pressed with its side face towards the second flange, against a side face of the receiving means, which side face is at the front in the receiving direction. In addition, the outer slope permits the plain bearing to be more easily introduced into the receiving opening. To optimise that lever action it can be provided that the inside diameter of the plain bearing body is equal to the inside diameter of the ring.

In a preferred development the collar portions of the plain bearing in the receiving position project in a radial travel component at most outwardly to such an extent that they do not protrude with their free ends radially beyond the outer periphery of the plain bearing body. In that way the collar portions can still be guided without any problem through the receiving opening. By virtue of their radial partial extent, the collar portions can be bent over further radially outwardly for example by a flat pressure face which is guided in opposite relationship to the receiving direction and parallel to the first flange against the free ends, in which case the free ends slide away radially outwardly at the contact surface.

Preferably the free ends are provided with a bevel which extends from the inside outwardly in the receiving direction. That bevel facilitates in particular the first bending movement of the axial or substantially axial collar portions, insofar as the pressure face of a tool firstly respectively engages the radially outer edge of the free ends and, as a consequence of a lever action, produces a force moment which acts radially outwardly.

Preferably the plain bearing is made in one piece and preferably in the form of a plastic injection moulding part. In that case the plastic material, like that of a conventional plain bearing, can be distinguished by properties which are matched to the intended use of the plain bearing. They include for example abrasion resistance, temperature resistance, corrosion resistance, vibration damping and low weight, whereby maintenance-free dry running of a shaft in the plain bearing is a possibility. The plain bearing can be produced from a plurality of plastic materials in a multi-component injection moulding process. For that purpose for example the plain bearing surface of the plain bearing, against which a supported shaft runs, can be of a particularly wear-resistant and temperature-resistant plastic material and the collar portions and the parts of the plain bearing body which support the plain bearing surface can involve a plastic material which has good damping properties.

The rear side face of the bearing receiving means body can be in the form of a contact face for contact of the plain bearing system against a component to which the plain bearing system can be mounted. For that purpose the contact face can be specifically adapted to a given component or, in the sense of a mass-produced article, it can be in the form of a flat face which extends in perpendicular relationship to the longitudinal axis of the receiving bore.

In a preferred configuration of the plain bearing system the axial length of the plain bearing body can be smaller by a small amount than the axial length of the receiving opening. In that way the collar portions, after insertion of the plain bearing into the receiving opening, remain with a correspondingly large region of their end connected to the plain bearing body, in the receiving opening. By virtue of the collar portions being bent over to afford the second flange, the plain bearing body can be further pulled into the receiving opening in the receiving direction, whereby the firm fit of the plain bearing in the receiving opening is reinforced. The amount involved can correspond approximately to one to two times the wall thickness of the plain bearing body.

For fixing thereof and/or for securing thereof to the component, the plain bearing system can have a fixing device. Preferably the bearing receiving means body can be fixed to the component by way of the provided fixing device.

The plain bearing can thus be assembled with the bearing receiving means to afford the plain bearing system in essentially two assembly steps:

after the provision of a plain bearing with axially extending collar portions and receiving body, for example from different dispensers, the plain bearing with its collar portions and the following plain bearing body can be fitted through the receiving opening in the receiving direction in such a way that its first flange comes to bear against the front side wall, with its inside which is towards the plain bearing body; and in a second assembly step the axial collar portions can first be bent over radially with their free ends by a suitable tool, for example by means of a cone which is moved with its tip coaxially with respect to the plain bearing and in opposite relationship to the receiving direction into the plain bearing body. The collar portions can then be pressed by means of a further tool with a flat pressure face against the rear side wall, in which case they come to bear against the rear side wall. In order to bend over the collar portions to the position of being in contact with the rear side face in one working operation, the tool can have a flat pressure face with a central, preferably cylindrical raised portion for the first step of bending over the collar portions and/or for axially guiding the tool in the hollow-cylindrical plain bearing body. The assembled plain bearing system can then be caused to bear against the component with the rear side face of the bearing receiving means body acting as the contact face, and can be fixedly connected to the component by way of the fixing device such that the second flange formed by the bent-over collar portions is effectively clamped between the component and the receiving body and thus ensures that the plain bearing is secured against rotation and displacement in the receiving means. By virtue of the collar portions being bent over and then clamped in position the collar portions can further pull the plain bearing body and the first flange further into the receiving opening or press them against the side face of the receiving means, which is at the front in the receiving direction, so that the press fit can be further reinforced.

That simple assembly procedure is well suited to the production of mass-produced parts. The plain bearing systems can be for example prefabricated at one location and used at another.

The fixing device can have at least one fixing opening provided in the bearing receiving means body for a screw or rivet connection to the component. A row of corresponding fixing openings can be provided in the component, as a mass-produced configuration, which can then be used in accordance with intended positioning of the plain bearing system in the component, for fixing thereof. Preferably the longitudinal axis of the fixing opening extends parallel to the longitudinal axis of the receiving opening and perpendicular to the contact face. Accordingly the longitudinal axis extends in the direction of the pressing pressure with which the contact body is pressed against the component. The bearing receiving means body in itself can preferably be made from a metal sheet.

In a desirable configuration there are provided two fixing openings arranged on a circumference around the receiving opening and in mutually opposite relationship. Desirably, a receiving body produced from metal sheet can involve a rhombic contour with two diagonals of different lengths, wherein the fixing openings are to be arranged in the corners into which the longer diagonal faces, and the receiving opening is to be arranged centrally at the point of intersection of the two diagonals. In addition to a screw or rivet connection it is also possible to provide a plug connection for carrying radial forces.

Other embodiments can also have an arrangement of three or more fixing openings which are preferably arranged symmetrically at equal angular spacings between their centre points on the circumference.

In another fixing form for the plain bearing system which appears appropriate in particular when relatively high radial loadings occur it can be provided that the shaft supported in the plain bearing system is additionally guided by a bore in the component, which in a fixing position is arranged in alignment with the receiving opening. Larger tolerances are then also permissible for those bores. In that form the plain bearing can serve as a linear bearing.

The plain bearing system in accordance with one of the above-described embodiments with a plain bearing according to one of the above-described embodiments can be assembled. The method of assembling the plain bearing for a shaft for carrying axial and/or radial forces of the shaft in a bearing receiving means, wherein the plain bearing (1) has a hollow-cylindrical plain bearing body (2) and a radially outwardly extending first flange (3) arranged at a first end (4) of the plain bearing body (2) and a ring (6), arranged at the second end (5) of the plain bearing body (2) which is in opposite relationship to the first end (4), of peripherally spaced axially extending collar portions (7) which can be bent over outwardly to afford a second flange (8), and the bearing receiving means (11) has a bearing receiving means body (13) with a receiving opening (14) adapted to the outside diameter ($d_a$) of the plain bearing body (2) for receiving the plain bearing (1), can comprise the following method steps:

provide the plain bearing (1) and the bearing receiving means (11), passing the plain bearing (1) with its collar portions (7) and the subsequent plain bearing body (2) through the receiving opening (14) in such as way that its first flange (3) comes to bear with its inside that is towards the plain bearing body (2) against a side face (15) of the bearing receiving means body (13), that is the front side face in the receiving direction (a), bending over the axial collar portions (7) with their free ends in the radial direction by means of a tool so that the collar portions come to bear with their insides that are towards the plain bearing body (2) against a side face (16) of the bearing receiving means body (13), that is the rear side face in the receiving direction (a), and removing the tool.

The operation of bending over the axial collar portions can be effected in two method steps insofar as the collar portions, in a first step, are bent over in a radial direction by means of a suitable tool, for example a cone, which is moved with its tip coaxially with respect to the plain bearing (2) and in opposite relationship to the receiving direction (a) into the plain bearing body (2), and in a second step are pressed by means of a further tool with a flat pressure face against the rear side wall.

Preferably the operation of bending over the collar portions in the radial direction towards the rear side face is effected in one working operation. To bend over the collar portions, it is possible to provide a tool which with a first element bears against the first flange in the working position and which, for bending over the collar portions, is guided with a second element in opposite relationship to the receiving direction against the rear side face of the bearing receiving means body.

In that case the tool as the second element can have a flat pressure face with a central, preferably cylindrical raised portion for first bending over the collar portion and/or for coaxially guiding the tool in the hollow-cylindrical plain bearing body, and with its central raised portion it can be moved coaxially with respect to the plain bearing and in opposite relationship to the receiving direction into the plain bearing body. The first element can be a pressure element, in particular a pressure punch, which is pressed against the first flange.

If, as described above, the collar portions in the condition of not being bent over extend with a radial travel component at most outwardly to such an extent that they protrude radially as far as the outer periphery of the plain bearing body, the operation of bending over the collar portions can also be effected in one method step by means of a tool which has a flat pressure face for bending over the collar portions. For that purpose the pressure face can be guided parallel to the contact face and in opposite relationship to the receiving direction against the free ends of the collar portions which are guided by the bearing receiving means, and by way of which the collar portions can be bent over with their free ends in sliding relationship radially outwardly. The bending-over operation can be effected until the collar portions are in contact against the rear side face.

In a preferred configuration the tool as the first element can have a screw with a screw head, a screw shank which includes a smooth first portion which is closer to the screw head and a second portion which preferably adjoins it as far as the free end and which is provided with a male screwthread, while as the second element it has a pressure face with a screwthreaded bore provided perpendicularly thereinto for engagement of the second portion. The operation of bending over the collar portions can be effected in the following method steps:

axially introducing the screw shank in the receiving direction into and through the plain bearing body until the underside of the screw head bears against the first flange, engaging the second portion into the screwthreaded bore, and continuing screwing and thus displacing the pressure face by screwing in opposite relationship to the receiving direction (a) against the rear side face (16) of the bearing receiving means body (13) with the collar portions being bent over at the same time to afford the second flange.

To bend over the collar portions the screw can be so arranged with its shank projecting through the receiving opening that it bears with the underside of its head against the first flange, it is arranged with its smooth portion in the receiving opening, it preferably bears displaceably at the inside against the plain bearing body, it extends with its male screwthread out of the receiving opening, and it can be brought into engagement with the female screwthread. For bending over the collar portions the pressure face can be displaced by way of the rotation of the screw against the free ends of the collar portions and further, with the collar portions thus being bent over, until the collar portions come to bear against the rear side face and form the second flange.

The outer diameter of the screw head can be at least as large as the outside diameter of the first flange in order to be able to apply a necessary pressing force by way of the entire first flange. Preferably the screwthreaded bore is provided centrally in the pressure face.

The outside diameter of the second portion is preferably less than that of the first portion. In that way for bending over the collar portions the pressure face can engage the free ends of the collar portions, projecting radially inwardly therebeyond, and can thus permit the collar portions to be more easily and more reliably bent over.

The assembled plain bearing system with the rear side face of the bearing receiving means body can be mounted as a contact face for bearing against a component and can be fixedly connected thereto by way of a fixing device so that the second flange formed by the bent-over collar portions is effectively clamped between the component and the receiving body.

By virtue of the collar portions being bent over and subsequently clamped in position the plain bearing body and the first flange can be further pulled into the receiving opening and the first flange can be pressed against the front side face of the bearing receiving means.

When using the above tool with a screw and contact pressure, the side face of the component, which is provided for contact of the plain bearing system and in which the screwthreaded bore with the female screwthread for the screw is provided can serve as the contact pressure face. In that way, in a first step, the plain bearing system can be screwed against the workpiece, with the simultaneous formation of the second flange. In a subsequent step the plain bearing system can be connected to the component by way of its provided fixing device. Finally the screw can be released from the tool and removed from the plain bearing system.

If, as described above, a bore aligned in the fixing position with the receiving opening is additionally disposed in the component, then instead of the screw head, a screwthreaded shank with a screw nut engaging thereon and the second portion, instead of the screwthread or additionally, for releasable radial spreadability at least of the second portion, can be provided, by which the second portion can be fixed in the fixing position at the inside of the bore and can thus form a support for tightening the screw nut against the first flange.

FIGURES

The invention is described in greater detail hereinafter by means of an embodiment by way of example with reference to the accompanying drawing in which.

DETAILED DESCRIPTION

Figure 1:
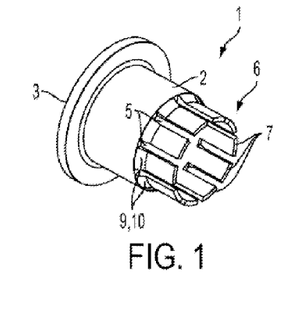
FIG. 1 shows a perspective view of a first embodiment of a plain bearing.
Figure 2:
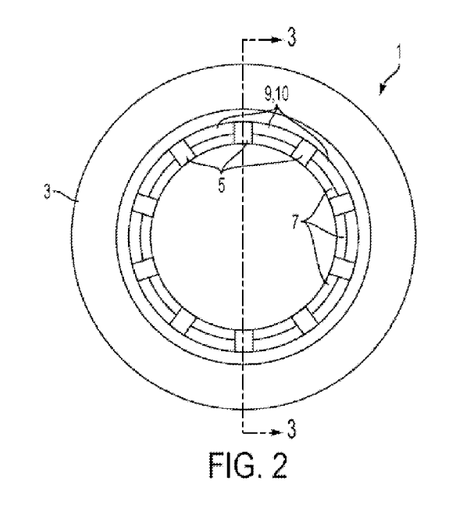
FIG. 2 shows a plan view of the plain bearing.
Figure 3:
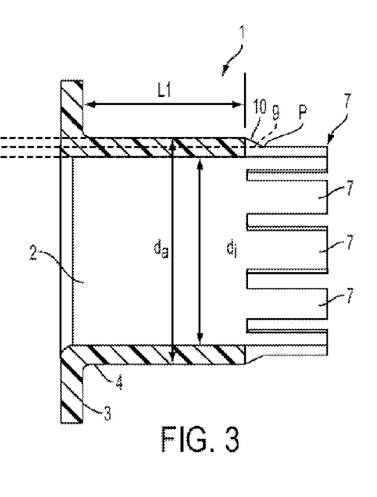
FIG. 3 shows a view in longitudinal section of the plain bearing taking along a center section line 3-3 of FIG. 2, FIGS. 4a to 4c are views in longitudinal section of an assembly of the plain bearing of FIG. 1, taken along section line 3-3 of FIG. 2, with a bearing receiving means to afford a plain bearing system by means of a tool.

Referring to FIGS. 1 to 3, shown therein is a plain bearing 1 in a first embodiment comprising a hollow-cylindrical plain bearing body 2 and a first flange 3 which is arranged at a first end 4 of the plain bearing body 2 and which extends radially outwardly. Provided at a second end 5 of the plain bearing body 2, which is in opposite relationship to the first end 4, is a ring 6 of axially extending, peripherally spaced collar portions 7. As demonstrated in FIGS. 4a to 4c, the collar portions 7 can be bent over outwardly to afford a second flange 8 which is shown in FIGS. 4b and 4c.

As can be seen in particular from FIGS. 1 and 3 the wall thickness of the collar portions 7 is less than that of the plain bearing body 2 and the first flange 3. The inside diameter $d_i$ of the plain bearing body 2 is equal to the inside diameter $d_i$ of the ring 6. Furthermore the collar portions 7 go into the plain bearing body 2 in a transitional region 9 which has a linear cross-sectional taper in the form of a slope 10 at its radially outer side face. That affords the possibility that, as shown in greater detail hereinafter, the plain bearing body 2 can be pulled with its first flange 3 more greatly into a bearing receiving means 11 shown in FIGS. 4a to 4c, by the collar portions 7 being bent over to afford the second flange 8 shown in FIGS. 4b and 4c.

In this embodiment the collar portions 7 are arranged uniformly spaced over the periphery. Here there are ten collar portions which are formed integrally at the second end. The end opening of the plain bearing body 2 is rounded off towards the first end 4.

Figure 4A:
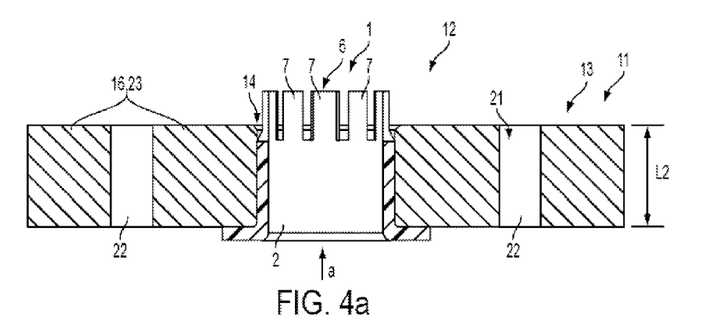
Figure 4B:
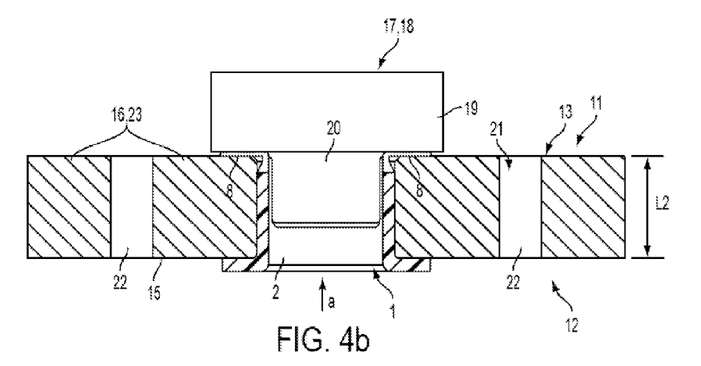
Figure 4C:
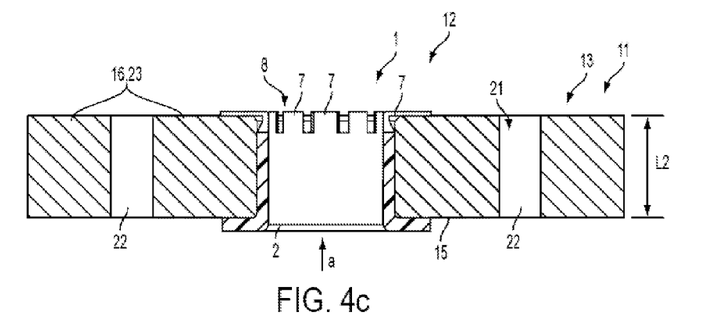
Figure 4D:
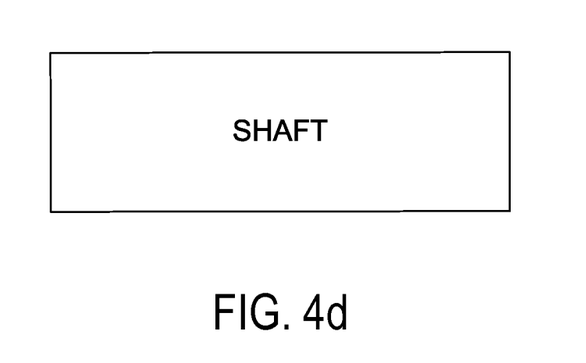
FIG. 4d shows a labeled representation of a shaft for use with the plain bearing.

FIGS. 4a to 4c show a plain bearing system 12 with the plain bearing 1 illustrated in FIGS. 1 to 3 and the bearing receiving means 11 which has a bearing receiving means body 13 with a receiving opening 14 adapted to the outside diameter $d_a$ of the plain bearing receiving means body 13. As shown, the receiving opening 14 has an axial length which opens into two opposing side faces 15, 16 of the bearing receiving means body 13, which serve for contact of the two flanges 2, 8, a front side face 15 which is at the front in the receiving direction a for contact of the first flange 3 and a rear side face 16 which is at the rear in the receiving direction a for contact of the second flange 8 formed by the bent-over collar portions 7. As shown, the axial length of the receiving opening extends from the front side face 15 to the rear side face 16 of the plain bearing body 2.

FIGS. 4a to 4c show assembly of the plain bearing system 12 in given working phases. In FIG. 4a the plain bearing 1 is introduced into the receiving opening 14 in the receiving direction a to such an extent that the first flange 3 bears against the front side face 15.

FIG. 4b shows a tool 17 in the form of a pressing punch 18 which has a pressure face 19 and an end cylindrical extension 20 adapted to the inside diameter of the plain bearing 2, for coaxial guidance of the tool 17 in the plain bearing 1. In this case FIG. 4b shows the condition of the plain bearing assembly 12 in which the pressing punch 18 has already bent the collar portions 7 over to afford the second flange 8, by means of its pressure face 19.

It can be clearly seen from FIGS. 4a to 4c that the plain bearing body 2, upon introduction of the plain bearing 1 into the receiving opening 4, does not extend with its second end 15 to the rear side face 16 so that the end region connected to the plain bearing body 2 remains with the transitional region 9 of the collar portions 7 in the receiving opening 14. As shown, the axial length of the plain bearing body L1 is smaller by a small amount than the axial length of the receiving opening L2. When the collar portions 7 are bent over, the plain bearing 1 is further drawn into the receiving opening 14 in the receiving direction a by virtue of the reduced cross-section of the collar portions 7 with respect to that of the plain bearing body 2 and the fact that the end region of the collar portions 7 remains in the receiving opening 14. That provides that the first flange 3 is pulled more strongly against the front side face 15 of the bearing receiving means 11. In that way the press fit of the plain bearing 1 in the bearing receiving means 11 is generally reinforced and the resistance to rotation of the plain bearing 1 in the bearing receiving means 11 is increased.

The plain bearing system 12 is also provided with a fixing device 21 for fixing it to a component (not shown here). The fixing device 21 has two fixing openings 22 which are provided in the bearing receiving means body 13 and which extend parallel to the receiving opening 14 and through which a connecting element such as for example a screw or rivets can be passed for fixing the plain bearing system 12 to the component. The fixing openings 23 are arranged on both sides of the receiving opening 14 in mutually opposite relationship and in a line with the receiving opening 14.

For fixing the plain bearing system 12 to the component (not shown here) it is provided that the plain bearing system 12 can be moved in the receiving direction a against the component with its rear side face 16 of the bearing body 2, which is in the form of the contact face 23, and can be fixedly connected thereto by way of the fixing device 21. That provides that the second flange 8 formed from the bent-over collar portions 7 is effectively clamped between the component and the contact face 21 so that the non-rotatability and non-displaceability of the plain bearing 1 in the bearing receiving means 11 is substantially enhanced.

The plain bearing system 12 can thus be prefabricated in the form of a mass-produced part and fixed at a prepared location on the component. For that purpose the component can have for example a row of openings for producing a screw connection to the plain bearing system 12, which can be selected depending on the respectively desired positioning of the plain bearing system on the component. Accordingly the plain bearing system 12 presented here is suitable as a mass-produced part which can be fixed to a component, also in the form of a mass-produced part, with a given number of prefabricated openings or the like for selectively fixing the plain bearing system 12.

Figure 5:
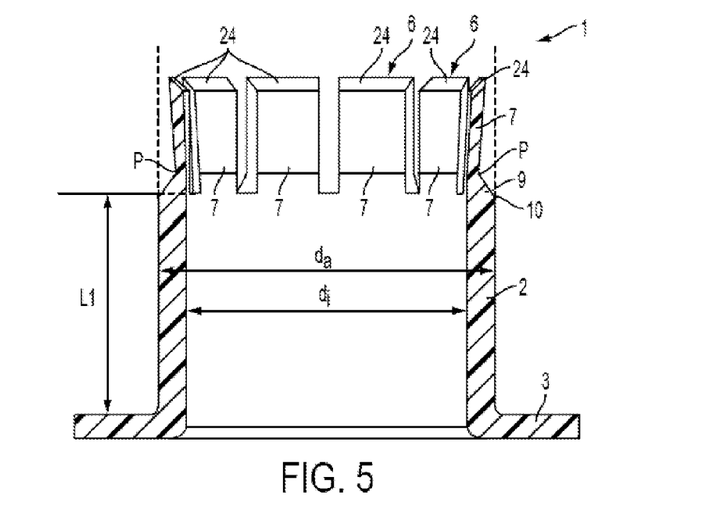
FIG. 5 shows a view in longitudinal section through a second embodiment of the plain bearing taken along a center section line similar to FIG. 2, and FIGS. 6a to 6c are a view in longitudinal section showing an assembly of the plain bearing of FIG. 5, taken along a center section line similar to FIG. 2, with a bearing receiving means to afford a plain bearing system by means of a tool.

FIG. 5 shows a view in longitudinal section of the plain bearing 1 in a second embodiment. It differs from the first embodiment of the plain bearing 1 in the configuration of the collar portions 7. The collar portions 7 extend outwardly towards their free ends in an axial travel component so that the internal space enclosed thereby enlarges conically in the receiving direction a. That is indicated in FIG. 5 by the broken line which extends the dimension of the outside diameter $d_a$ of the plain bearing body 2 and which is approached by the collar portion 7 which is sectioned here. Also provided at the free ends thereof is a respective bevel 24 which extends from the inside outwardly towards the free ends in the receiving direction a or in the direction from the plain bearing body 2. Both measures provide, as demonstrated hereinafter, that the collar portions 7 can be more easily and more reliably bent over in the radial direction with their free ends, or can be bent away at a base point P. The base point P marks the beginning of the reduced wall thickness of the plain bearing 1 towards the collar portions 7.

Figure 6A:
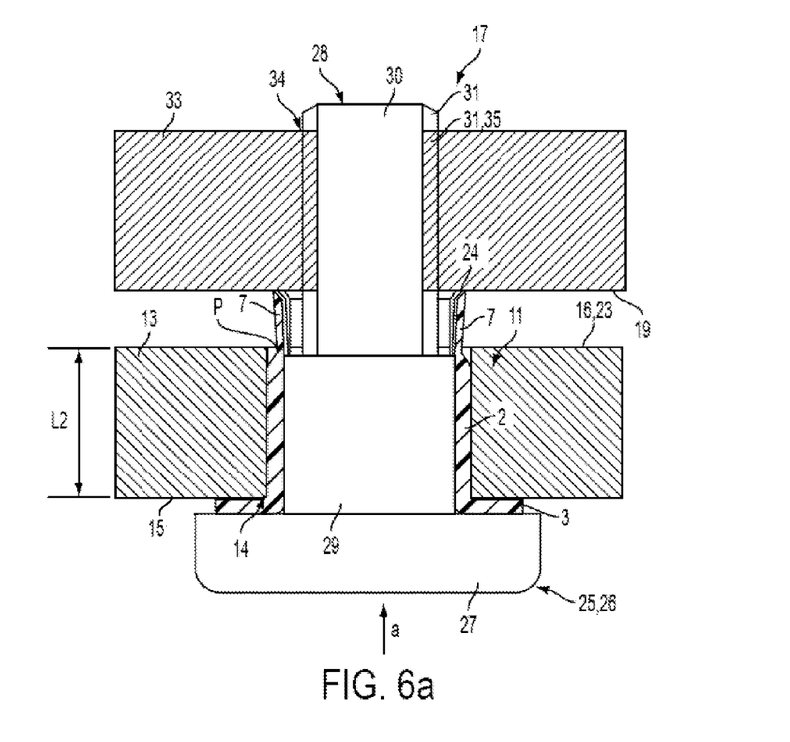
Figure 6B:
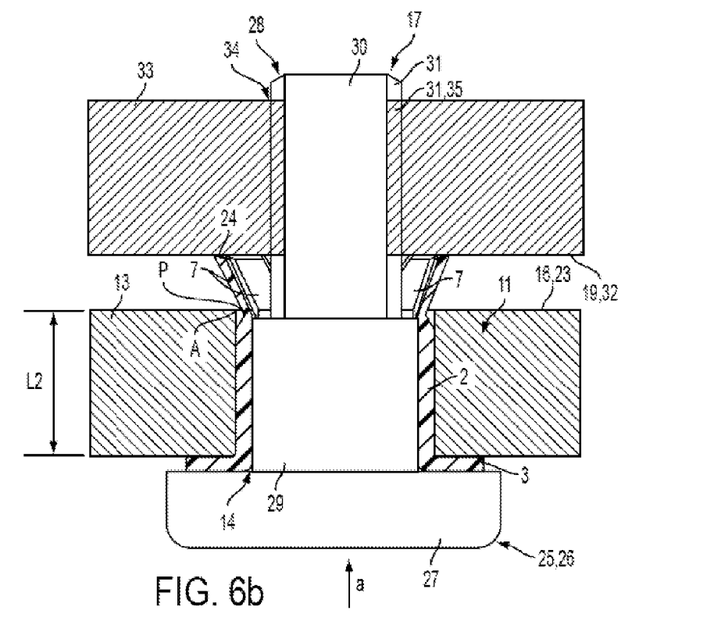
Figure 6C:
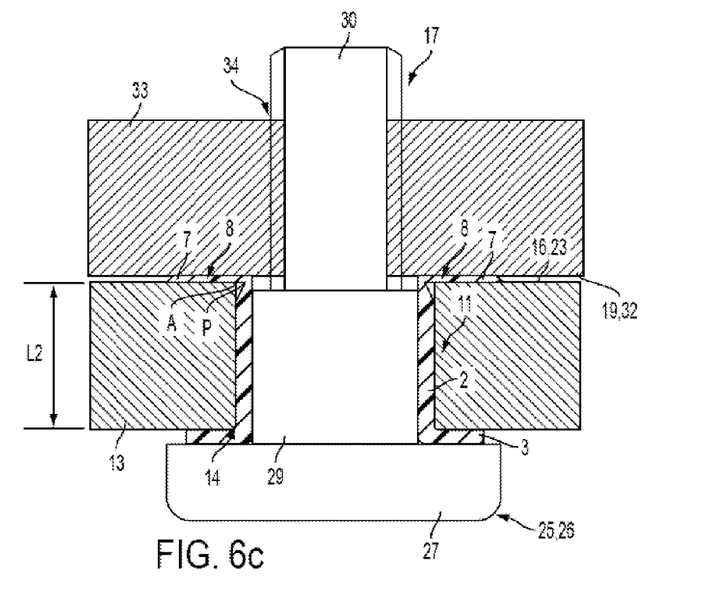

FIGS. 6a to 6c show the procedure involved in bending over the collar portions 7 in three steps. The tool 17 used for that purpose differs fundamentally from that shown in FIGS. 4a to 4c, but, like the tool 17 shown in FIGS. 4a to 4c, performs the function of bending over the collar portions 7 in such a way that they form the second flange 8 (FIG. 6c). As the first element 25, the tool 17 has a screw 26 with a screw head 27 and a screw shank 28. The screw shank 28 includes a first portion 29 which adjoins the screw head 27 and which has a flat surface and in its free end region a second portion 30 with a male screwthread 31. The second element 32 of the tool 17 is a component element 33 in plate form, with the pressure face 19. Provided in the component 33 in perpendicular relationship to the pressure face 19 is a screwthreaded bore 34 into which the second portion 30 engages and meshes with its male screwthread 31 with the female screwthread 35 in the screwthreaded bore 34.

In FIG. 6a the screw shank 28 is guided axially in the receiving direction a through the plain bearing body 2 to such an extent that the screw head 27 bears in surface contact with its underside against the first flange 3 and presses it against the front side face 15 during the bending-over operation. The first portion 29 of the screw 26 bears at the inside against the plain bearing body 2 and stabilises it during the subsequent operation of bending over the collar portions 7. The second portion 30 extends out of the plain bearing body 2 in the receiving direction a. The diameter of the first portion corresponds to the inside diameter $d_i$ of the plain bearing body 2 while the diameter of the second portion 30 is substantially smaller. That provides that the pressure face 19 of the component element 23 is enlarged radially inwardly so that the collar portions 7 reliably engage with their free ends in a region of the pressure face 19 which is spaced from a radial inner edge of the pressure face 19. The second portion 30 is in screwthreaded engagement with the screwthreaded bore 34 of the component element 33. In this case the component element 33 is already screwed on to the second portion 30 to such an extent that it is in contact at its pressure face 19 with the free ends of the collar portions 7. Thus FIG. 6a shows the moment in time before the beginning of the collar portions 7 being bent over. As already mentioned hereinbefore the ring of collar portions 7 which have not yet been bent over opens in a slightly conical configuration in the receiving direction.

With a progressive screwing movement, the pressure face 19 approaches the rear side face 16 of the bearing receiving means body 13, in which case the collar portions 7 slide radially outwardly with their free ends against the pressure face 19 and are bent over radially outwardly. In that situation the collar portions 7 bend at the base point P at which the transitional region 9 to the collar portions 7 ends. That point P is still in the receiving opening 17 of the bearing receiving means body 13 so that, with further progress in being bent over or bent away at the point P, the collar portions 7 come to bear at a contact point A laterally against the edge of the receiving opening 14. That results in the formation of a lever with a shorter lever arm A-B and a longer lever arm A—contact point of the free end of the collar portions 7 against the pressure face 19. With contact at the collar portions 7 at the respective point A and with further bending-over movement of the collar portions 7 by further forward movement of the pressure face 19 in opposite relationship to the receiving direction a, the plain bearing body 2 is further drawn by the lever force into the receiving opening 14 in the receiving direction a and the first flange 3 is drawn more firmly against the front side face 15 of the bearing receiving means 11. That reinforces the press fit of the plain bearing in the bearing receiving means 11, which increases the operational reliability of the plain bearing system 1.

FIG. 6c shows the end point of the operation of bending over the collar portions 7, in which the collar portions 7 are bent over to provide the second flange 8 and bear against the rear side face 16 of the bearing receiving means body 13. That provides that the plain bearing 1 has been fitted in a press fit in the bearing receiving means 11 in one working operation. The tool 17 is then removed by unscrewing.

Thereafter, although this is not shown here, the plain bearing system 12 is fixed by way of a fixing device to a component (not shown here), with the second flange being clamped between the component and the contact face, which further improves positional stability and thus operational reliability of the plain bearing 1 in the bearing receiving means.

LIST OF REFERENCES

1 plain bearing
2 plain bearing body
3 first flange
4 first end
5 second end
6 ring
7 collar portion
8 second flange
9 transitional region
10 slope
11 bearing receiving means
12 plain bearing system
13 bearing receiving means body
14 receiving opening
15 front side face
16 rear side face
17 tool 18 pressing punch
19 pressure face
20 extension
21 fixing device
22 fixing opening
23 contact face
24 bevel
25 first element
26 screw
27 screw head
28 screw shank
29 first portion
30 second portion
31 male screwthread
32 second element
33 component
34 screwthreaded bore
35 female screwthread
a receiving direction
$d_a$ outside diameter
$d_i$ inside diameter
P point
A contact point

What is claimed is:

1. A plain bearing system for a rotating shaft comprising:
a plain bearing in a form of an injection moulded plastic part, the plain bearing having a hollow-cylindrical plain bearing body and a radially outwardly extending first flange arranged at a first end of the plain bearing body, wherein provided at a second end of the plain bearing body, which is in opposite relationship to the first end, is a ring of peripherally spaced collar portions which are bent over outwardly to afford a second flange, and
a bearing receiving means having a bearing receiving means body with a receiving opening adapted to an outside diameter ($d_a$) of the plain bearing body to receive the plain bearing, wherein the receiving opening opens into two opposing side faces of the bearing receiving means body, which the two flanges bear against, respectively, the two opposing side faces comprising a front side face which is at a front in a receiving direction (a) for contact of the first flange and a rear side face which is at a rear in the receiving direction (a) for contact of the second flange formed by the bent-over collar portions such that the bearing receiving means body is located between the first flange and the second flange; and
wherein the plain bearing is secured to the bearing receiving means against rotation between the plain bearing and the bearing receiving means by the first flange and the second flange of the plain bearing against the bearing receiving means with a press fit, with the first flange of the plain bearing in contact with the front side face of the bearing receiving means body and the second flange of the plain bearing in contact with the rear side face of the bearing receiving means body; and
wherein the plain bearing system is arranged to carry axial and/or radial forces of the rotating shaft as the shaft rotates; and
wherein the two opposing side faces of the bearing receiving means body are provided by a single body such that the first flange and the second flange of the plain bearing bear against the single body.

2. A plain bearing system according to claim 1 wherein an axial length of the plain bearing body from the first flange to the collar portions is shorter than an axial length of the receiving opening from the front side face to the rear side face of the bearing receiving means body.

3. A plain bearing system according to claim 1 wherein the wall thickness of the collar portions is less than that of the plain bearing body.

4. A plain bearing system according to claim 1 wherein the inside diameter ($d_i$) of the plain bearing body is equal to or less than the inside diameter ($d_i$) of the ring.

5. A plain bearing system according to claim 1 wherein the collar portions extend outwardly towards their free ends in an axial travel component at most to the outside diameter ($d_a$) of the plain bearing body.

6. A plain bearing system according to claim 1 wherein the collar portions at their free ends have a bevel which extends from the inside outwardly in the direction from the plain bearing body towards the free ends.

7. A plain bearing system according to claim 1 wherein the rear side face of the bearing receiving means body is in the form of a contact face for contact of the plain bearing system against a component to which the plain bearing system is fixedly connectable.

8. A plain bearing system according to claim 7 characterised by a provided fixing device to fixedly connect the plain bearing system with its contact face to the component.

9. A method of assembling a plain bearing for a shaft in a bearing receiving means, wherein the plain bearing is in a form of an injection moulded plastic part and has a hollow-cylindrical plain bearing body and a radially outwardly extending first flange arranged at a first end of the plain bearing body and a ring, arranged at the second end of the plain bearing body which is in opposite relationship to the first end, of peripherally spaced axially extending collar portions which are bendable over outwardly to afford a second flange, and the bearing receiving means has a bearing receiving means body with a receiving opening adapted to the outside diameter ($d_a$) of the plain bearing body to receive the plain bearing, wherein the receiving opening opens into two opposing side faces of the bearing receiving means body, which the two flanges bear against, respectively, a front side face which is at a front in a receiving direction (a) for contact of the first flange and a rear side face which is at a rear in the receiving direction (a) for contact of the second flange formed by the bent-over collar portions such that the bearing receiving means body is located between the first flange and the second flange, comprising the following method steps:
providing the plain bearing and the bearing receiving means,
passing the plain bearing with its collar portions and the subsequent plain bearing body through the receiving opening in such a way that its first flange comes to bear with its inside that is towards the plain bearing body against the front side face of the bearing receiving means body,
bending over the axial collar portions with their free ends in the radial direction by means of a tool so that the collar portions come to bear with their insides that are towards the plain bearing body against the rear side face of the bearing receiving means body such that the plain bearing is secured to the bearing receiving means against rotation between the plain bearing and the bearing receiving means by the first flange and the second flange of the plain bearing bearing against the bearing receiving means with a press fit, with the first flange of the plain bearing in contact with the front side face of the bearing receiving means body and the second flange of the plain bearing in contact with the rear side face of the bearing receiving means body, wherein the plain bearing system is arranged to carry axial and/or radial forces of the rotating shaft as the shaft rotates and wherein the two opposing side faces of the bearing receiving means body are provided by a single body such that the first flange and the second flange of the plain bearing bear against the single body, and removing the tool.

10. A method according to claim 9 wherein the operation of bending over the collar portions in a radial direction towards the rear side face is effected in one working operation and the tool in the working position bears with a first element against the first flange and for bending over the collar portions is guided with a second element in opposite relationship to the receiving direction (a) against the rear side face of the bearing receiving means body.

11. A method according to claim 10 wherein the tool as the first element has a screw with a screw head and a screw shank which includes a smooth first portion which is closer to the screw head and a second portion which adjoins the first portion to the free end and which is provided with a male screwthread, and as the second element a pressure face with a screwthreaded bore provided perpendicularly therein for engagement of the second portion, comprising the following method steps for bending over the collar portions:

axially introducing the screw shank in the receiving direction (a) in and through the plain bearing body until the underside of the screw head bears against the first flange, engaging the second portion into the screwthreaded bore, and displacing the pressure face in opposite relationship to the receiving direction (a) against the rear side face of the bearing receiving means body with the collar portions being simultaneously bent over to form the second flange.

12. A method according to claim 9 with the further method step that the assembled plain bearing system is brought to bear against the component with the rear side face of the bearing receiving means body as the contact face and is fixedly connected thereto by way of a fixing device such that the second flange formed from the bent-over collar portions is clamped between the component and the contact face.

* * * * *